(12) United States Patent
Huang et al.

(10) Patent No.: US 7,716,694 B2
(45) Date of Patent: May 11, 2010

(54) ACTUATING MODULE FOR A DISK DRIVE

(75) Inventors: Jeng-Wen Huang, Hinchu (TW); Yuh-Sheng Lin, Hinchu (TW); Jung-Fu Chen, Hinchu (TW)

(73) Assignee: Lite-On It Technology Corporation, Taipei (TW)

( * ) Notice: Subject to any disclaimer, the term of this patent is extended or adjusted under 35 U.S.C. 154(b) by 404 days.

(21) Appl. No.: 11/475,113

(22) Filed: Jun. 27, 2006

(65) Prior Publication Data

US 2007/0101349 A1  May 3, 2007

(30) Foreign Application Priority Data

Nov. 2, 2005  (TW) .............................. 94138461 A

(51) Int. Cl.
*G11B 33/02* (2006.01)
(52) U.S. Cl. .................................................... 720/653
(58) Field of Classification Search ................. 720/653, 720/652, 685
See application file for complete search history.

(56) References Cited

U.S. PATENT DOCUMENTS

| | | | | |
|---|---|---|---|---|
| 6,341,115 | B1 * | 1/2002 | Otani et al. .................. | 720/653 |
| 7,406,701 | B2 * | 7/2008 | Kim ........................... | 720/652 |
| 2004/0205785 | A1 * | 10/2004 | Takahashi et al. ........... | 720/601 |
| 2004/0216152 | A1 * | 10/2004 | Ezawa et al. ................ | 720/659 |

* cited by examiner

*Primary Examiner*—Angel A. Castro
(74) *Attorney, Agent, or Firm*—Ming Chow; Sinorica, LLC

(57) ABSTRACT

An actuating module includes an actuating member, a magnetic plunger engaging the actuating member due to magnetic power and capable of disengaging the actuating member upon receipt of an actuating signal, and a flexible flat cable. The flexible flat cable includes a plurality of laterally connected data wires. The data wires includes at least one branch wire connected electrically to the magnetic plunger for transmitting the actuating signal to the magnetic plunger so as to release the actuating member.

5 Claims, 3 Drawing Sheets

ACTUATING MODULE FOR A DISK DRIVE

FIELD OF THE INVENTION

The present invention relates to an actuating module, and more particularly to an actuating module for use in a slim-type disk drive.

BACKGROUND OF THE INVENTION

A flexible printed circuit (FPC) is generally used to interconnect two separately formed (or operably connected) electronic devices or components in order to transmit data signals therebetween.

FIG. 1 is a top planar view of a conventional slim-type disk drive 2 that includes an outer casing 4, and a disk tray 6 disposed movably within the casing 4. The casing 4 has a front side 402 formed with an opening to permit extension and withdrawal of the disk tray 6 outside and inside the casing 4. The disk tray 6 is movable relative to the casing 4 between an extended position, in which, the disk tray 6 is projected outwardly from the casing 4 via the opening, and a retracted position, in which, the disk tray 6 is withdrawn into the casing 4 via the opening.

The conventional slim-type disk drive 2 further includes a holding post 404 projecting from the casing 4 into a guiding groove 8 formed along the traveling path D1 of the disk tray 6, and a positioning member 602 pivoted on the disk tray 6. The positioning member 602 has a barbed end 602a. When the disk tray 6 is withdrawn to the retracted position, the holding post 404 is moved relative to the disk tray 6 so as to be hooked by the barbed end 602a of the positioning member 602, thereby retaining the disk tray 6 stationarily within the casing 4.

Referring to FIGS. 1 and 2, the conventional slim-type disk drive 4 further includes an actuating module 10 and a transmission mechanism 20 disposed respectively on the disk tray 6. The actuating module 10 includes an actuating member 12, a magnetic plunger 1002 and a signal transmission cable 1004.

The actuating member 12 is engaged to the magnetic plunger 1002 by virtue of the magnetic power, and is further capable of disengaging from the magnetic plunger 1002 upon receipt of an actuating signal. Thus, the actuating member 12 drives the positioning member 602 via the transmission mechanism 20.

The signal transmission cable 1004 in traditional disk drive is a flexible printed circuit and includes an actuating connecting portion 1004a and a processor connecting portion 1004b. The actuating connecting portion 1004a is electrically coupled to the magnetic plunger 1002 for transmitting an actuating signal. The processor connecting portion 1004b is electrically coupled to a processor (not shown in figures) for transmitting the actuating signal to the magnetic plunger 1002 so as to activate the magnetic plunger 1002 for driving the positioning member 602 to release the holding post 404 and eject the disk tray 6 out of the casing 4.

The outer casing 4 has a front panel 18 at the front side 402 thereof. The front panel 18 is formed with a press button 1802 that is electrically connected to the magnetic plunger 1002 and the processor via the signal transmission cable 1004. The press button 1802 is capable of producing the actuating signal to the processor via the signal transmission cable 1004, and then the processor sends the actuating signal to the magnetic plunger 1002 via the signal transmission cable 1004. In addition, the press button 1802 is capable of controlling the activation of the positioning member 602 via the magnetic plunger 1002.

One drawback of the aforementioned conventional disk drive is that during the soldering a distal section of the actuating connecting portion 1004a on a lateral side of the magnetic plunger 1002, the distal section usually curls upward relative to the lateral side due to the elasticity of the signal transmission cable 1004 and the high temperature of a soldering gun. This annoys and inconveniences the assembler in the production line.

SUMMARY OF THE INVENTION

The object of the present invention is to provide an actuating module for use in a disk drive of slim type. The actuating module includes a flexible flat cable of a unique structure having the flexibility for avoiding the drawback encountered during mounting of the same onto the magnetic plunger in order to form the actuating module.

In accordance with the present invention, an actuating module is provided for use in a slim-type disk drive. The disk drive includes an outer casing enclosing a disk tray movably therein, and a positioning member disposed within the casing for retaining the disk tray in the casing. The actuating module is capable of disengaging the disk tray from being retained by the positioning member. The actuating module is disposed on the disk tray and includes: an actuating member; a magnetic plunger engaging the actuating member due to magnetic power, the actuating member disengaging from the magnetic plunger upon receipt of an actuating signal so as to actuate the actuating member to drive the positioning member, thereby disengaging the disk tray from being retained by the positioning member; and a flexible flat cable including a plurality of laterally connected data wires. The data wires includes at least one branch wire connected electrically to the magnetic plunger for transmitting the actuating signal to the magnetic plunger so as to actuate the magnetic plunger to release the actuating member for driving the positioning member.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENT

Figure 1:
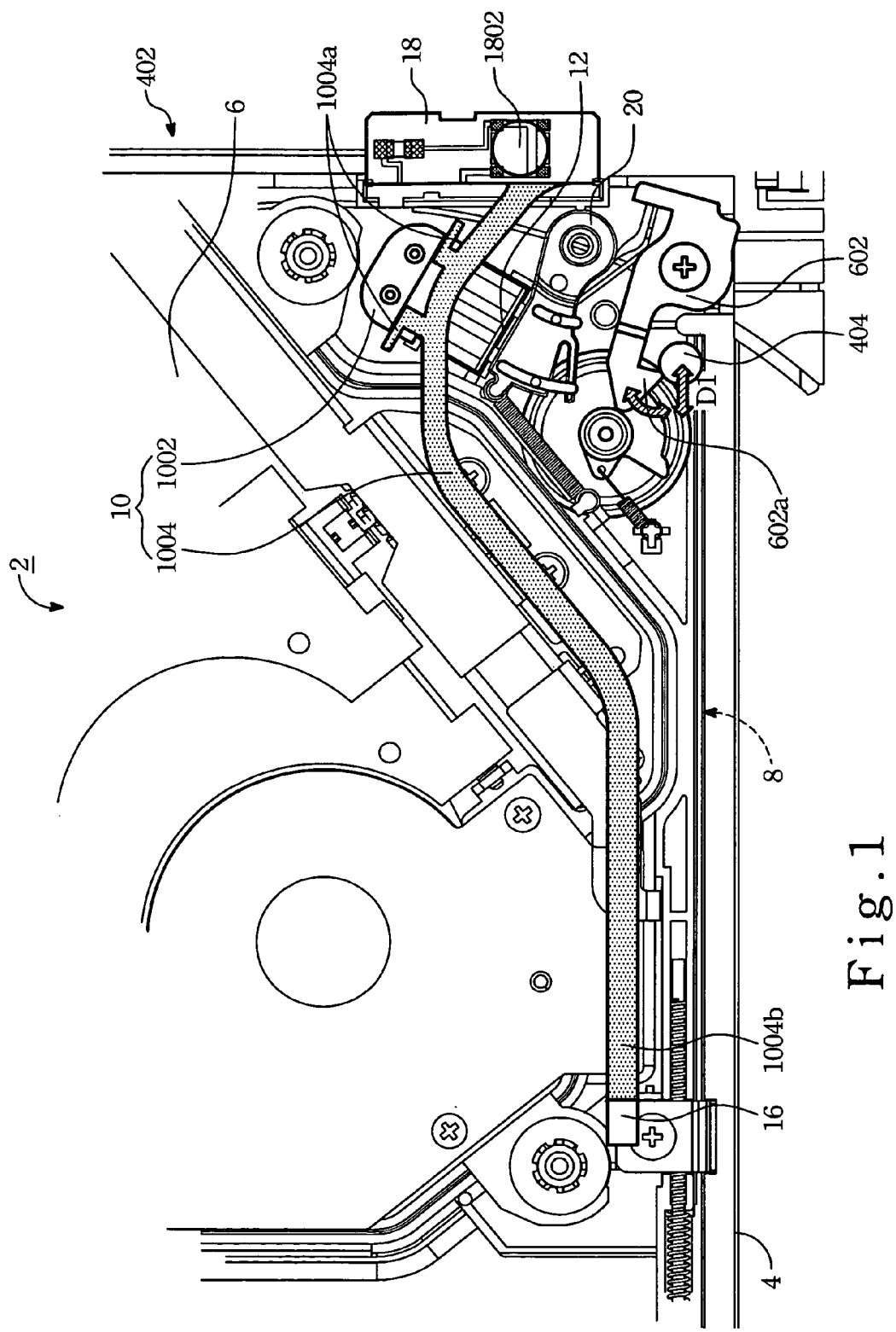
FIG. 1 is a partially top view of a conventional slim-type disk drive.
Figure 2:
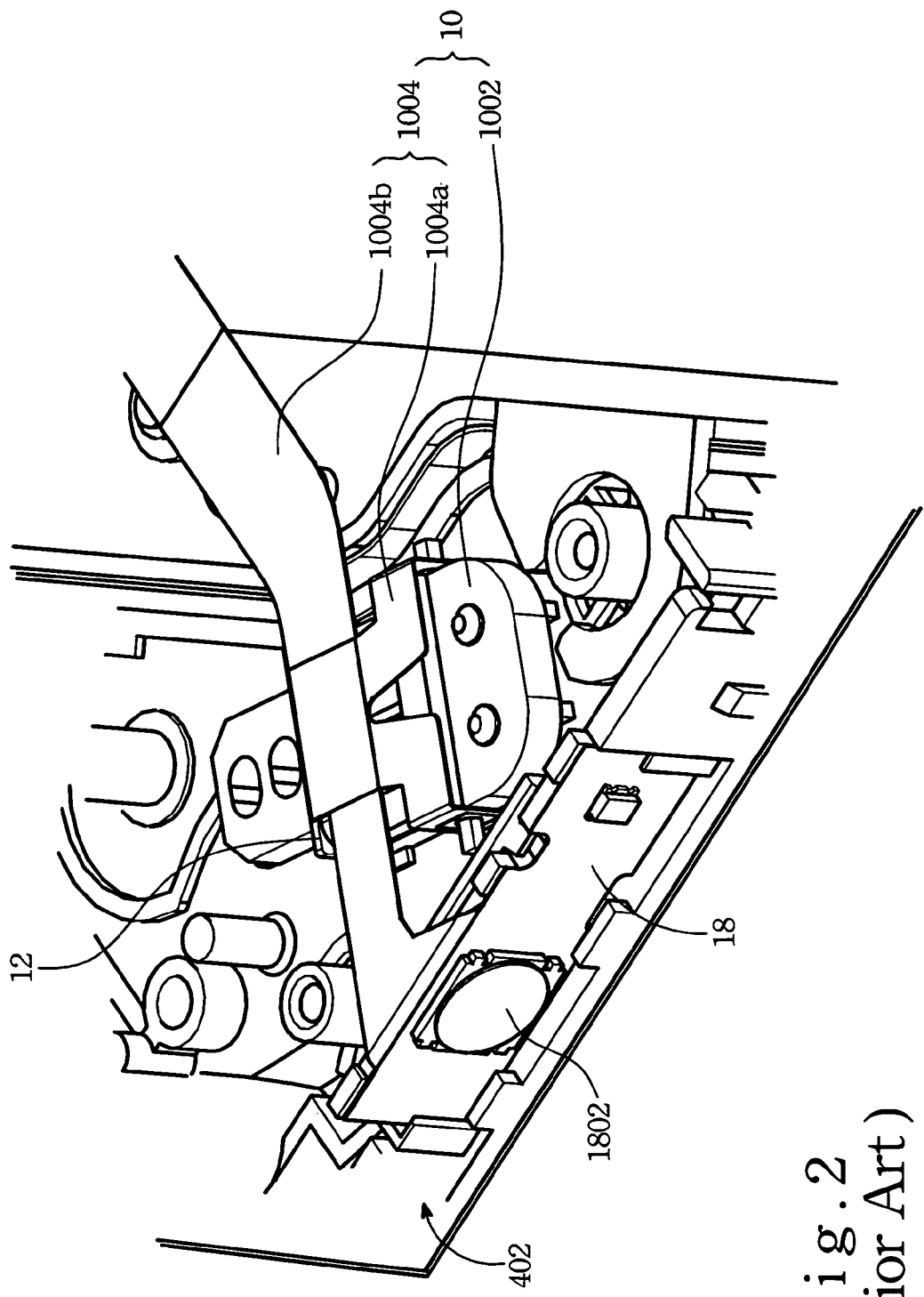
FIG. 2 is a partially enlarged and perspective view illustrating an actuating module in the conventional slim-type disk drive.
Figure 3:
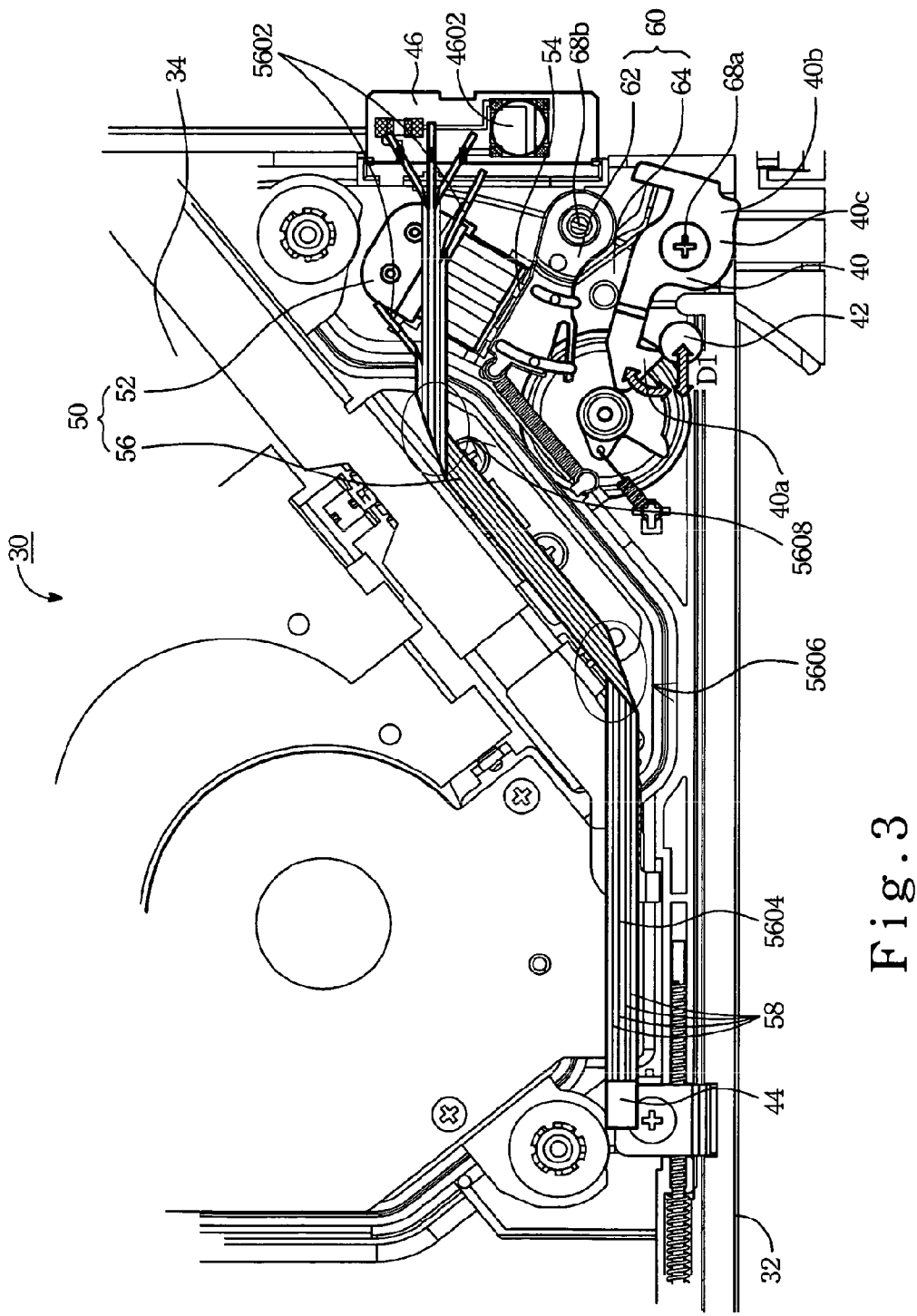
FIG. 3 is a partially top view illustrating an actuating module in the disk drive of the present invention.

FIG. 3 is a partially top view of the disk drive 30 of the present invention. The disk drive 30 includes a disk tray 34 disposed movably within an outer casing 32, a positioning member 40 for retaining the disk tray 34 within the casing 32, and an actuating module 50. The actuating module 50 is mounted on the disk tray 34, and includes an actuating member 54, a magnetic plunger 52 and a flexible flat cable 56. The disk tray 34 is movable with respect to the casing 32 between an extended position, in which, the disk tray 34 is extended outwardly from the casing 32, and a retracted position, in which, the disk tray 34 is withdrawn into the casing 32.

The actuating member 54 is engaged to the magnetic plunger 52 due to magnetic power. Upon receipt of an actuating signal, the actuating member 54 disengages from the magnetic plunger 52 so as to actuate the positioning member 40 via a transmission mechanism 60, thereby causing disengagement between the positioning member 40 and the disk tray 34 in order to eject the latter out of the casing 32.

The flexible flat cable 56 includes a plurality of laterally connected data wires 58. The data wires 58 further includes at least one branch wires 5602 connected electrically to the magnetic plunger 52 for transmitting the actuating signal to the magnetic plunger 52 so as to actuate the magnetic plunger 52 for driving the positioning member 40. In this embodiment, the branch wires 5602 are soldered to the magnetic plunger 52. The flexible flat cable 56 further comprises first fold 5606 and second fold 5608. The first and second folds 5606, 5608 are formed so that the flexible flat cable 56 is properly positioned without interfering with the internal mechanisms in the disk drive 30 and the branch wires 5602 are connected to the magnetic plunger 52 and press button 4602 in the proper positions. Specifically, the internal mechanisms can be an optical pickup unit which is moved along the radius of the disk in the drive 30. By positioning the flexible flat cable with the two folds 5606, 5608, when the optical pickup unit moves in the drive 30, the optical pickup unit does not interfere with the flexible flat cable 56. Otherwise, the optical pickup unit interferes with the flexible flat cable without folds. However, the folds are not limited to be two folds; people skilled in the art can modify the position and/or number of the folds to meet their designs.

The positioning member 40 is associated operably with the transmission mechanism 60. The disk drive 30 further includes a holding post 42 fixed securely within the casing 32 adjacent to the disk tray 34. A barbed end 40a of the positioning member 40 engages the holding post 42 when the disk tray 34 is disposed at the retracted position. Under such condition, once the magnetic plunger 52 receives the actuating signal, the actuating member 54 is released from the magnetic plunger 52 so as to drive the transmission mechanism 60 to result in actuation of the positioning member 40, which, in turn, causes disengagement of the barbed end 40a of the positioning member 40 from the holding post 42, thereby permitting movement of the disk tray 34 to the extended position.

The outer casing 32 includes a front panel 46 formed with a press button 4602 that is electrically connected to the flexible flat cable 56. By pressing the press button 4602, the actuating signal is sent from the press button 4602 to the magnetic plunger 52 via the branch wires 5602.

In this embodiment, the positioning member 40 includes a pivot pin 68a, and has two distal sections 40a, 40b and an intermediate section 40c that is disposed between the distal sections 40a, 40b. The positioning member 40 is pivoted to the casing 32 via the pivot pin 68a. The transmission mechanism 60 includes a fulcrum pin 68b, a lever bar 62 and a transmission rod 64. The lever bar 62 has a distal end pivoted to the casing 32 via the fulcrum pin 68b. The transmission rod 64 has two distal sections respectively connected to the lever bar 62 and the positioning member 40.

When the actuating member 54 is released from the magnetic plunger 52, the lever bar 62 is driven by the actuating member 54 and, in turn, to actuate the positioning member 40 via the transmission rod 64 so as to result in disengagement of the barbed end 40a of the positioning member 40 from the holding post 42.

In summary, by arrangement of the branch wires 5602 to separate laterally from the laterally connected data wires 58 within the actuating module of the present invention, the problem of upward curling of the distal section with respect to the mounting element can be avoided. The actuating module is therefore suitable for use in the slim-type disk drive.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An actuating module for use in a slim-type disk drive, the disk drive including an outer casing enclosing a disk tray movably within the casing, and a positioning member for retaining the disk tray within the casing, the actuating module capable of driving the positioning member in order to disengage the disk tray from being retained by the positioning member, the actuating module being disposed on the disk tray and comprising:
   an actuating member;
   a magnetic plunger engaging said actuating member due to magnetic power, said actuating member disengaging from said magnetic plunger upon receipt of an actuating signal so as to drive the positioning member, thereby disengaging the disk tray from being retained by the positioning member; and
   a flexible flat cable including a plurality of laterally connected data wires parallel to each other, wherein said flexible flat cable includes at least two folds and said data wires including at least one branch wire separated from said laterally connected data wires and connected electrically to said magnetic plunger for transmitting said actuating signal to said magnetic plunger so as to actuate said magnetic plunger to release said actuating member for driving the positioning member, wherein the two folds are formed and positioned so that the flexible flat cable is positioned without interfering with a movable mechanism in the disk drive.

2. The actuating module according to claim 1, wherein said branch wire is soldered to said magnetic plunger.

3. The actuating module according to claim 1, wherein the disk tray is movable with respect to the casing between an extended position, in which, the disk tray is extended outwardly from the casing, and a retracted position, in which, the disk tray is withdrawn into the casing, the disk drive further including a transmission mechanism disposed within the casing and associated operably with the positioning member, and a holding post fixed securely adjacent to the disk tray and engaging the positioning member when the disk tray is disposed at the retracted position such that once said magnetic plunger receives said actuating signal, said actuating member being released from said magnetic plunger and impacting the transmission mechanism to result in actuation of the positioning member, which, in turn, causes disengagement of the positioning member from the holding post, thereby permitting movement of the disk tray to the extended position.

4. The actuating module according to claim 3, wherein the positioning member includes a pivot pin, and has a barbed end engaging the holding post when the disk tray is disposed at the retracted position, a distal end opposite to the barbed end, an intermediate section that is disposed between the ends and that is pivoted to the casing via the pivot pin, the transmission mechanism including a fulcrum pin, a lever bar having a distal end pivoted to the casing via the fulcrum pin parallel to the pivot pin and a transmission rod having two distal sections respectively connected to the lever bar and the positioning member, said actuating member capable of driving the lever bar when released from said magnetic plunger so as to actuate the positioning member via the transmission mechanism for disengaging the barbed end of the positioning member from the holding post.

5. The actuating module according to claim 1, wherein the outer casing includes a front panel formed with a press button that is electrically coupled to the flexible flat cable, pressing of the press button capable of producing said actuating signal to said magnetic plunger via said branch wire.

* * * * *